United States Patent
Svedberg et al.

(10) Patent No.: US 8,602,483 B2
(45) Date of Patent: Dec. 10, 2013

(54) VEHICLE DOOR REINFORCEMENT STRUCTURE

(75) Inventors: Jonas Svedberg, Göteborg (SE); Andreas Wikman, Kungälv (SE); Errol Michaud, Hisings Backa (SE); Carl Stalhammar, Göteborg (SE); Svante Borged, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/516,244

(22) PCT Filed: Dec. 17, 2009

(86) PCT No.: PCT/SE2009/000523
§ 371 (c)(1),
(2), (4) Date: Oct. 15, 2012

(87) PCT Pub. No.: WO2011/075010
PCT Pub. Date: Jun. 23, 2011

(65) Prior Publication Data
US 2013/0168996 A1 Jul. 4, 2013

(51) Int. Cl.
*B60J 5/00* (2006.01)

(52) U.S. Cl.
USPC ............................................ 296/146.6

(58) Field of Classification Search
USPC ................. 296/187.03, 187.12, 146.6
See application file for complete search history.

(56) References Cited

U.S. PATENT DOCUMENTS

| | | | |
|---|---|---|---|
| 4,750,779 A | | 6/1988 | Van Rooij |
| 4,796,946 A | * | 1/1989 | Wilson et al. ............. 296/146.6 |
| 5,466,032 A | * | 11/1995 | Clausen et al. .......... 296/187.12 |
| 6,196,619 B1 | * | 3/2001 | Townsend et al. ........ 296/146.6 |
| 6,290,282 B1 | * | 9/2001 | Hortlund et al. .......... 296/146.6 |
| 7,059,657 B2 | | 6/2006 | Bodin et al. |
| 2002/0069609 A1 | * | 6/2002 | Nees et al. .................... 52/735.1 |
| 2007/0001483 A1 | * | 1/2007 | Uchida et al. ............ 296/187.12 |

FOREIGN PATENT DOCUMENTS

DE 102005014570 A1 10/2006
EP 1762408 A1 3/2007

OTHER PUBLICATIONS

International Search Report (Sep. 3, 2010) International application No. PCT/SE2009/000523.
Supplementary European Search Report (May 7, 2013) for corresponding European App. EP 09 85 2348.

* cited by examiner

Primary Examiner — Lori Lyjak
(74) Attorney, Agent, or Firm — WRB-IP LLP (57) ABSTRACT

A vehicle door is provided with a reinforcing structure which improves handling of impact energy in the longitudinal direction of the vehicle by transferring impact energy received by the A-pillar to the door through the door hinges and the reinforcing structure to the B-pillar of the vehicle frame.

13 Claims, 6 Drawing Sheets

VEHICLE DOOR REINFORCEMENT STRUCTURE

BACKGROUND AND SUMMARY

The present invention generally relates to reinforcing structures for motor vehicles, in particular for commercial vehicles provided with a cab. The invention relates to an impact transferring structure for reinforcing a door of a motor vehicle which more efficiently transfers impact energy to the vehicle frame in the longitudinal direction of the vehicle.

Structural reinforcements are commonly employed within motor vehicle doors to provide an increased level of protection against intrusion into the passenger compartment during a side impact collision. Such structural reinforcements are commonly referred to as "intrusion beams" or "side-impact beams". Common forms of known intrusion beams range from tubular members which horizontally extend between inner and outer panels of a vehicle door to metal stampings welded to a frame or an inner panel of the door.

One example of a structural reinforcement for a vehicle door is shown in U.S. Pat. No. 7,059,657. This patent describes a supporting frame of high strength steel with side impact guard beam, an outer panel fastened on the frame so that the side impact guard beam will be close to the frame, a beam structure releasably mounted on the frame, and an inner panel fastened on the beam structure, the window structure of the door being mounted on the releasable beam structure and located between the frame and the beam structure. The object of this arrangement is to absorb impact forces in the transverse direction of the vehicle under deformation of the beam.

While the arrangement shown and described in U.S. Pat. No. 7,059,657 and many other prior known arrangements have proven to be commercially acceptable for their intended side-impact applications in automobiles, they are not directly transferable to commercial vehicle. In a commercial vehicle, side impact protection of the type described above is usually not required, due to the height of the drivers cab above ground. Also, in passenger vehicles, impact forces occurring in the longitudinal direction during a frontal collision is commonly absorbed by deformation zones the front structure. In many commercial vehicles there is no front structure of this type that is suitable for use as a deformation zone.

Hence, it is desirable to improve the handling of impact energy in the longitudinal direction in the drivers cab of a commercial vehicle.

It is desirable to provide an apparatus for reinforcing a vehicle door which functions to reduce intrusion into the driver's compartment in the event of a frontal or offset frontal collision.

It is desirable to provide a vehicle door assembly with a reinforcing structure which improves handling of impact energy in the longitudinal direction by transferring impact energy received by the A-pillar to the door through the door hinges and the reinforcing structure to the B-pillar of the vehicle frame.

In the text, the terms "vehicle door" or "vehicle door assembly" relates to a substantially complete door comprising an inner skin panel, an outer skin panel and a door frame, onto which the inner and outer skin panels and a number of accessories are attached. Accessories may comprise component parts such as a hinge assembly, a latching means, a window operating mechanism, etc. The door frame is preferably a pressed sheet metal component that may include a frame surrounding a window opening. The vehicle frame comprises all chassis components surrounding the vehicle door assembly, including the A-pillar extending along the front portion of the door frame and the B-pillar extending along the rear portion of the door frame. References to a relative position, such as "front", "rear", "inner" or "outer" are taken relative to a central longitudinal axis through the vehicle in its main direction of travel.

The reinforced door comprises a door frame and a hinge assembly and a latching means. The hinge assembly comprises at least two hinges which pivotally interconnects the door frame and the vehicle frame. The latching means may retain the door frame in a closed position in the vehicle frame. The reinforced door assembly further comprises a reinforcement member extending through the door between the A-pillar and the B-pillar of the vehicle frame. The reinforcement member may have a first end attached to a front portion of the door frame, adjacent or directly to one hinge in the hinge assembly, or alternatively between an upper and a lower hinge making up the hinge assembly. A second end is attached to a rear portion of the door frame adjacent or directly to the latching means.

The motor vehicle may preferably, but not necessarily, be a commercial vehicle, which comprises a cab. The invention is particularly suitable for commercial vehicles of the cab-over type.

In the case of a commercial vehicle, impact energy received by the reinforcing structure during a frontal or offset frontal collision is at least partially transferred to the vehicle frame through the hinge. Frontal collision forces applied to a cab for a commercial vehicle may in some cases cause a twisting deformation of the A-pillar about an axis in its longitudinal extension. The reinforcing structure may assist in preventing this twisting deformation, which deformation may also affect the hinge assembly attached to the A-pillar. As a result, a displacement of the hinges may be prevented or at least reduced, so that the door may be retained in its closed position during the collision event.

According to one embodiment, the invention relates to a reinforcing structure in a vehicle door, which structure is arranged to transfer impact forces in the longitudinal direction of the vehicle. The structure may comprise a first reinforcing member having a longitudinal and vertical extension and being attached to a door frame between a hinge at a front portion of the door frame and a latching means at a rear portion of the door frame. The first reinforcing member may be connected to the door frame by means of welding, soldering or by use of adhesives or mechanical fasteners, such as rivets, screws or nut and bolt connectors.

The structure further comprises a second reinforcing member extending in the longitudinal direction of the vehicle from a front portion of the door frame at or near a hinge to a latching means at a rear portion of the door frame.

The positioning of the ends of the second reinforcing member is preferably selected so that the said ends are terminated at or adjacent a vertical plane at right angles to the longitudinal axis of the vehicle through the respective hinge or latching means. At the same time, the distance between the respective end of the second reinforcing member and its associated hinge or latching means may be varied upwards or downwards in the direction of the said vertical plane, so that the respective end is located at or near its associated hinge or latching means. In this context, "near" may be interpreted as less than half the distance between the hinges.

The second reinforcing member may have a shaped, profiled cross-section and has a greater longitudinal extension than the first reinforcing member, in that each end portion of the second reinforcing member extends beyond the outer limiting edges of the first reinforcing member. Each end portion is used for securing the second reinforcing member to the door frame at or adjacent the hinge and the latching means respectively.

The first reinforcing member and the second reinforcing member are connected to form a structure with a closed cross-section. The said members may be connected by means of welding, soldering or by use of adhesives or mechanical fasteners.

According to one example, the reinforcing structure comprises said interconnected first and second reinforcing members, wherein the second reinforcing member is a beam attached at its ends at the said hinge and at the said latching means. The beam may comprise a single pressed sheet metal component made from high strength steel or a similar suitable material. Each end of the beam may be attached to door frame by means of welding, soldering or by use of adhesives or mechanical fasteners.

According to a second example, the reinforcing structure comprises said interconnected first and second reinforcing members, wherein the second reinforcing member comprises a first section attached to the first reinforcing member and at least one further section attached between the first section and the door frame. Each further section connects the said first section to the door frame at one or both ends thereof. Each said further section may comprise a single pressed sheet metal component, in the form of a bracket, made from high strength steel or a similar suitable material. The thickness of the sheet metal component making up the further section may be equal to or greater than that of the first section.

For instance, the second reinforcing member may comprise a first section attached to the first reinforcing member, a second section attached at the said hinge and to a front portion of the first section, and a third section attached at the said latching means and to a rear portion of the first section. In this way, the first reinforcing member and the said first section of the second reinforcing member, as well as the respective second and third sections and the door frame, are connected to form a continuous structure with a closed cross-section, or box section Each of the second and third sections may be attached to their respective end of the beam and to the door frame by means of welding, soldering or by use of adhesives or mechanical fasteners.

The first section and the at least one further section preferably comprises mating portions with a profiled cross-section. Preferably, the first section and the at least one further section has the same cross-sectional profile to facilitate assembly of the sections. Preferably, the at least one further section retains its profiled cross-section at least up to its attachment point with the door frame.

As stated above, the first reinforcing member and the second reinforcing member are connected to form a structure with a closed cross-section. In addition, both ends of the second reinforcing member are connected to the door frame to form a structure with a closed cross-section. In this way, the reinforcing structure may be provided with a continuous force transferring structure with a closed cross-section along substantially the entire length of the second reinforcing member to form a box section. The cross-sectional area of the closed cross-section, or box section, may be maximised to improve the force transferring properties of the reinforcing structure. This can be achieved by shaping at least the second reinforcing member to provide it with a suitable cross-sectional shape. The first reinforcing member may also be provided with a shaped cross-sectional profile in the region between its attachment points or lines of attachment with the second reinforcing member, in order to increase the cross-sectional area of the closed cross-section further.

As indicated above, the reinforcing structure primarily comprises the box section created by the interconnected first and second reinforcing members as well as the interconnected portions of the door frame and the respective ends of the second reinforcing member. In addition, the first reinforcing member is also connected to the door frame along its outer periphery. This arrangement will improve the properties of the reinforcing structure by distributing impact forces to the door frame. In order to achieve this, the first reinforcing member has a vertical extension, or height, equal to or greater than that of the second reinforcing member.

According to one example, the second reinforcing member described above may have a substantially hat-shaped cross-sectional profile. However, the invention is not limited to such a profile. The cross-sectional profile may also vary along the length of the second reinforcing member.

It is desirable to provide a reinforcing structure that distributes impact forces in a substantially straight line between the hinge and the latching means. Hence the longitudinal axis of the second reinforcing member may be arranged parallel to a straight line connecting the hinge and the latching means. Alternatively, the first and second reinforcing members are arranged so that a straight line connecting the hinge and the latching means coincides with the closed cross-section.

The reinforcing structure is preferably arranged between an inner skin panel and a window supporting structure in the vehicle door. The first reinforcing member may be a door module onto which a number of accessories are attached. Accessories may comprise component parts such as a window operating mechanism, audio equipment such as a loudspeaker, etc. The door frame may have a stamped out recess substantially conforming to the general outline of the outer edge of the door module. According to one example, the door module, with or without accessories assembled, may be mounted to the outer surface of the door frame. Subsequently, the second reinforcing member in the form of a single beam is attached to the door module. Depending on the shape of the door frame, the door module may be adapted to have the beam mounted on its inner or its outer surface. The ends of the said beam are then attached at the said hinge and at the said latching means. According to an alternative example, the door module, with or without accessories assembled, may be mounted to the inner surface of the door frame. Subsequently, a first section of the second reinforcing member in the form of a single beam is attached to the door module. Similar to the above example, the door module may be adapted to have the first section mounted on its inner or its outer surface. The ends of the said first section are then attached at the said hinge and at the said latching means by means of a second and third section, or bracket.

The door module may comprise a substantially flat sheet metal component. As described above, the first reinforcing member forming said door module may be provided with local areas formed to contribute to the cross-sectional area of the closed box section when the second reinforcing member is attached. In this example, the first reinforcing member has a vertical extension, or height, greater than that of the second reinforcing member, in order to provide space for predetermined component parts and attachment portions for attaching the first reinforcing member to the door frame.

The invention further relates to a vehicle provided with a reinforcing structure as described above. The vehicle is preferably, but not necessarily, a cab-over type commercial vehicle.

The invention is, as a rule, not intended for reinforcing purposes during a collision with a relatively low passenger vehicle that strikes a front bumper or its associated under-run protection system. The invention is primarily intended for reinforcing purposes during collisions with vehicles such as SUV's, trucks or buses, or if the front portion of the cab is impacted by an object in the region of the cab above the bumper, where impact forces may affect the A-pillar of the cab.

Additional advantages of the present invention will be described in the subsequent description of the preferred embodiments and the appended claims, in combination with the appended drawings.

BRIEF DESCRIPTION OF DRAWINGS

In the following text, the invention will be described in detail with reference to the attached drawings. These drawings are used for illustration only and do not in any way limit the scope of the invention. In the drawings.

DETAILED DESCRIPTION

Figure 1:
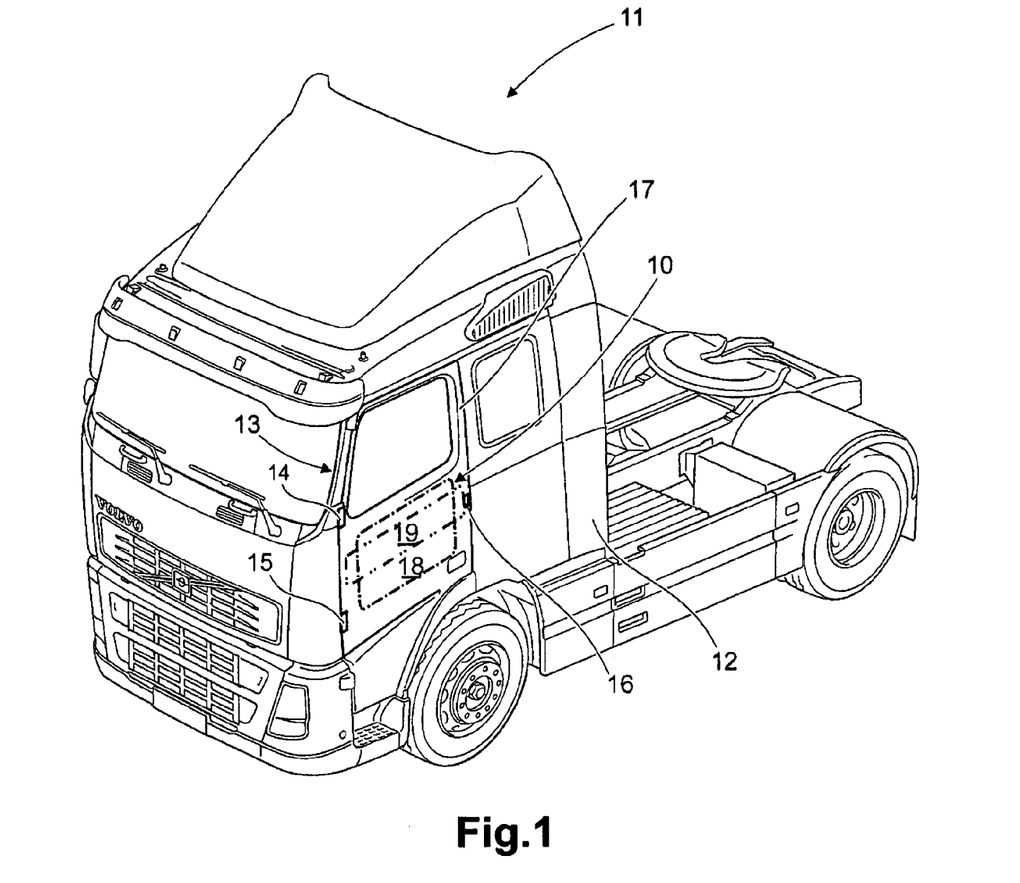
FIG. 1 shows a schematic perspective view of a vehicle provided with a reinforcing structure according to the invention.

FIG. 1 shows a schematic perspective view of a motor vehicle provided with a reinforcing structure 10 according to a first embodiment of the invention.

The motor vehicle 11 is a commercial vehicle of the cab-over type. In the case of a commercial vehicle of this type, impact energy received by the reinforcing structure during a frontal or offset frontal collision with, for instance, another commercial vehicle is at least partially transferred to the vehicle frame 12 from the A-pillar 13, through one of a pair of hinges 14, 15, the reinforcing structure 10 and a door latching means 15, to a rear portion of the vehicle frame 12 making up the cab. The hinges 14, 15 and the door latching means 16 are schematically indicated in FIG. 1, as they are not normally visible from the outside of the cab. The reinforcing structure is schematically indicated with dash-dotted lines inside a door 17 of the cab.

FIG. 1 schematically shows a first embodiment, the invention of the reinforcing structure 10, which structure is arranged to transfer impact forces in the longitudinal direction of the vehicle. The structure comprises a first reinforcing member 18 having a longitudinal and vertical extension and being attached to a door frame (not shown) between an upper hinge 14 at a front portion of the door 17 and the latching means 16 at a rear portion of the door frame. The door frame is located inside the outer skin panel of the door 17. The first reinforcing member can be connected to the door frame by means of welding, soldering or by use of adhesives or mechanical fasteners, such as rivets, screws or nut and bolt connectors. The reinforcing structure further comprises a second reinforcing member 19 extending in the longitudinal direction of the vehicle from the said upper hinge 14 to the said latching means 16 at a rear portion of the door frame.

Figure 3:
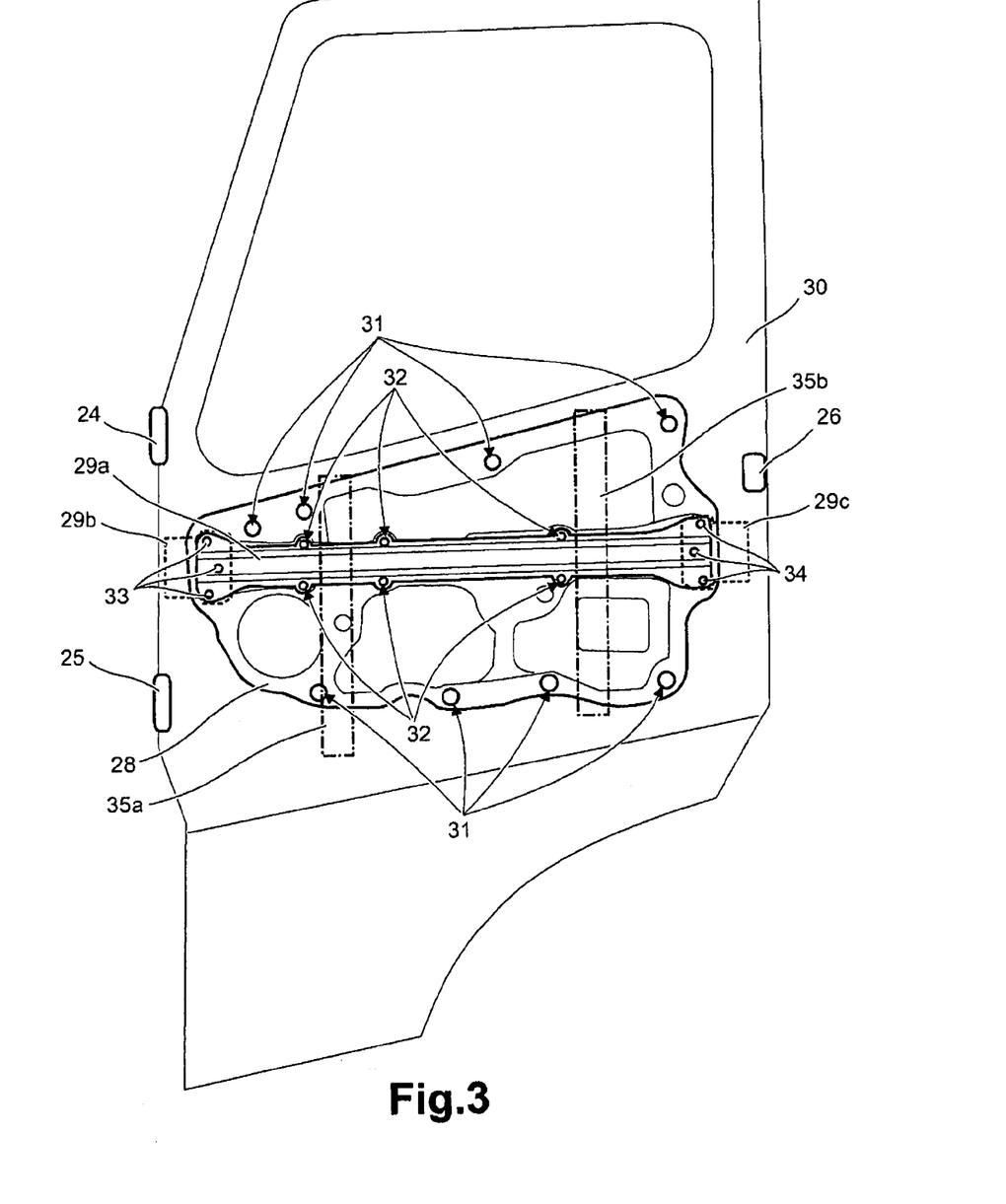
FIG. 3 shows a schematic detailed view of a door frame with an assembled reinforcing structure.
Figure 7:
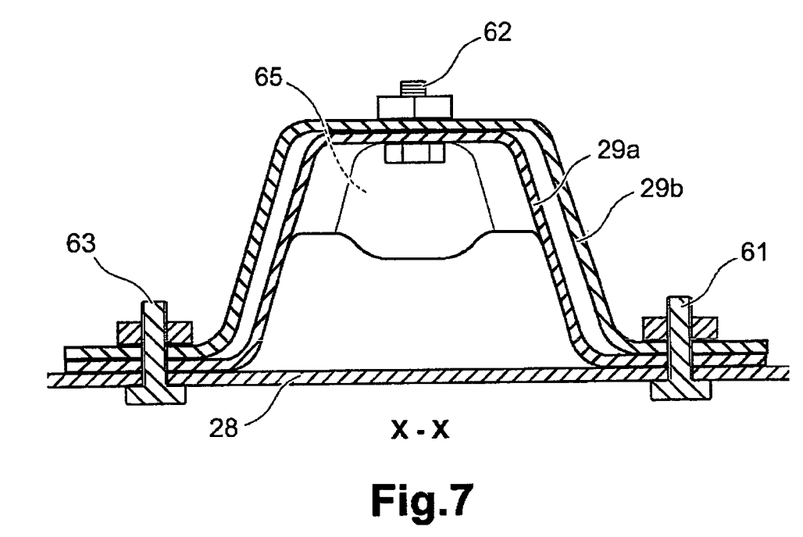
FIG. 7 shows an enlarged view of an attachment bracket attached to a front end of an reinforcing structure as shown in FIG. 3.
Figure 8:
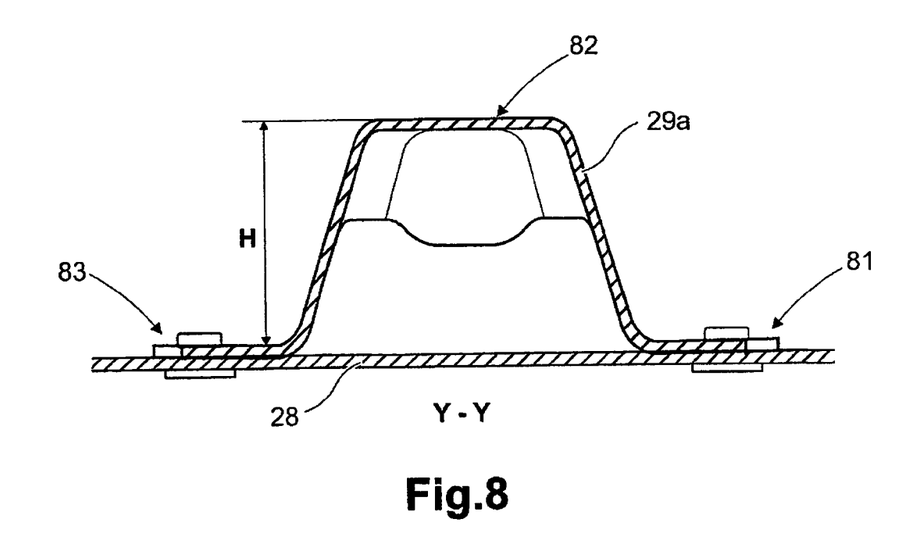
FIG. 8 shows a schematic cross-section through the structure and an associated attachment bracket, as shown in FIGS. 3 and 7.

The second reinforcing member 19 is indicated as a single, continuous beam. The beam can have a shaped, profiled cross-section, in the same way as shown in the embodiment of FIGS. 3 and 7. The beam 19 has a greater longitudinal extension than the first reinforcing member 18, in that each end portion of the second reinforcing member 19 extends beyond the outer limiting edges of the first reinforcing member 18. Each end portion is used for securing the second reinforcing member 19 to the door frame adjacent the upper hinge 14 and the latching means 16 respectively. The first reinforcing member 18 and the second reinforcing member 19 are connected to form a structure with a closed cross-section, or box section, in the same way as shown in FIG. 8.

Figure 2:
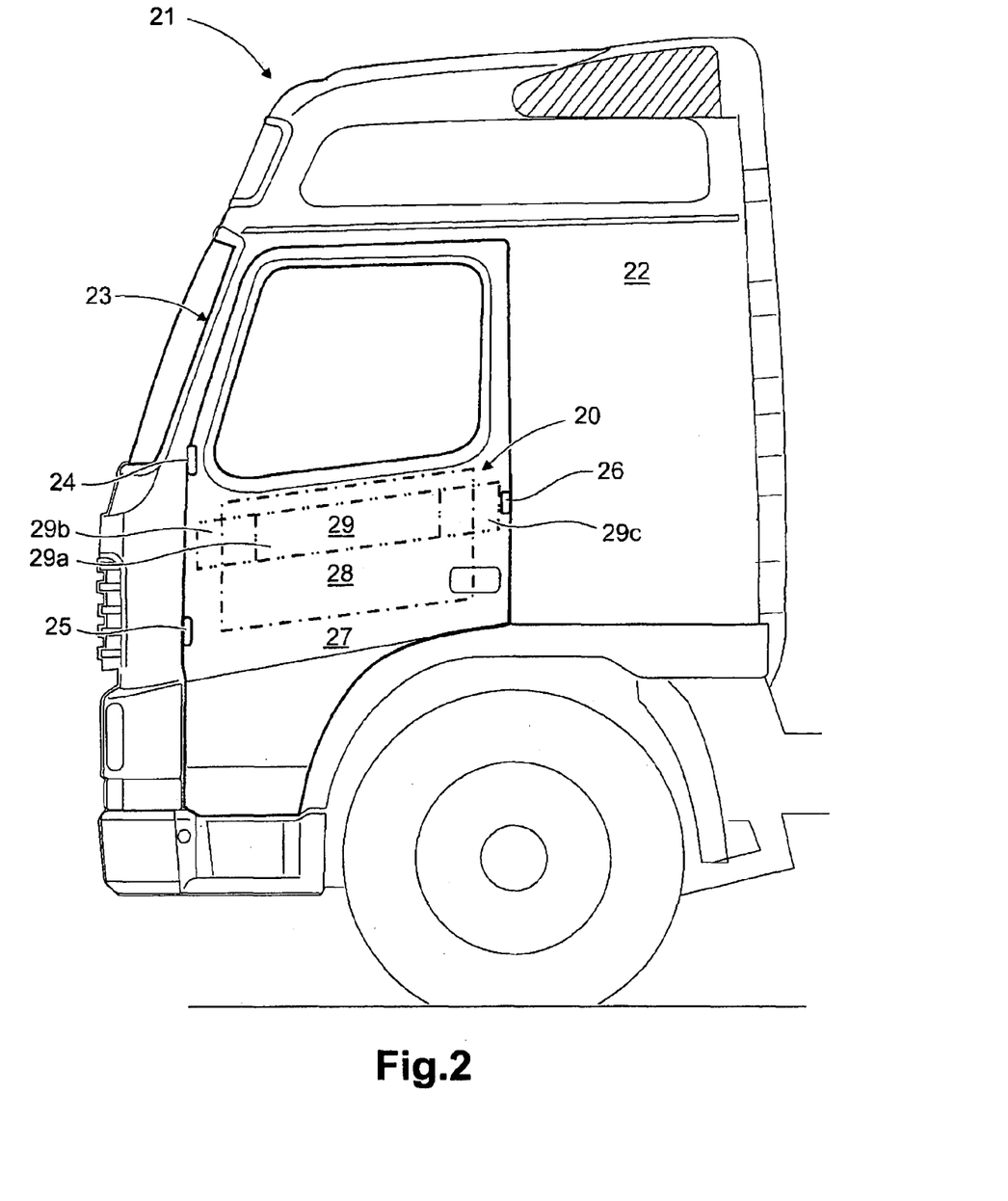
FIG. 2 shows a schematic side view of a vehicle door provided with a reinforcing structure according to the invention.

FIG. 2 shows a schematic side view of a vehicle door provided with a reinforcing structure 20 according to a second embodiment of the invention.

As in the embodiment of FIG. 1, the motor vehicle 21 is a commercial vehicle of the cab-over type. Similarly, impact energy received by the reinforcing structure during a frontal or offset frontal collision is at least partially transferred to the vehicle frame 22 from the A-pillar 23, through one of a pair of hinges 24, 25, the reinforcing structure 20 and a door latching means 25, to a rear portion of the vehicle frame 22 making up the cab. The hinges 24, 25 and the door latching means 26 are schematically indicated in FIG. 2, as they are not normally visible from the outside of the cab. The reinforcing structure is schematically indicated with dash-dotted lines inside a door 27 of the cab.

FIG. 2 schematically shows the reinforcing structure 20, which structure comprises a first reinforcing member 28 having a longitudinal and vertical extension and being attached to a door frame (see FIG. 3) between an upper hinge 24 at a front portion of the door 27 and the latching means 26 at a rear portion of the door frame. The door frame is located inside the outer skin panel of the door 27. The first reinforcing member can be connected to the door frame by means of welding, soldering or by use of adhesives or mechanical fasteners, such as rivets, screws or nut and bolt connectors. The reinforcing structure 20 further comprises a second reinforcing member 29 extending in the longitudinal direction of the vehicle from the said upper hinge 24 to the said latching means 26 at a rear portion of the door frame.

According to the second embodiment, the reinforcing structure comprises said interconnected first and second reinforcing members 28, 29, wherein the second reinforcing member 29 may comprise a first section 29a attached to the first reinforcing member 28, a second section 29b attached to the door frame at the said upper hinge 24 and to a front portion of the first section 29a, and a third section 29c attached at the said latching means 26 and to a rear portion of the first section 29a. As will be described in further detail below, the first reinforcing member 28 and the said first section 29a of the second reinforcing member 29, as well as the respective second and third sections 29b, 29c and the door frame, are connected to form a continuous structure with a closed cross-section, or box section FIG. 3 shows a schematic detailed view of a door frame with an assembled reinforcing structure, as indicated in FIG. 2, with the outer skin panel removed. The figure shows the reinforcing structure 20, with its first reinforcing member 28 attached to the door frame 30 between an upper hinge 24 at a front portion of the door 27 and the latching means 26 at a rear portion of the door frame 30. The first reinforcing member 28 is connected to the door frame 30 by means of mechanical fasteners, using nuts and bolts (not shown), at a number of first attachment points 31 adjacent the peripheral edge of the first reinforcing member 28. Similarly, the first section 29a of the second reinforcing member 29 (FIG. 2) is connected to the first reinforcing member 28 by means of mechanical fasteners, such as nuts and bolts (not shown). The second reinforcing member 29 is attached at a number of second attachment points 32 adjacent its upper and lower longitudinal edges which are placed in contact with the first reinforcing member 28.

In the embodiment shown in FIGS. 2 and 3, the reinforcing structure comprises said interconnected first and second reinforcing members 28, 29, wherein the second reinforcing member 29 comprises said first section 29a attached to the first reinforcing member 28, a second section 29b attached to the door frame at the said upper hinge 24 and to a front portion of the first section 29a, and a third section 29c attached at the said latching means 26 and to a rear portion of the first section 29a. The second and third sections 29b, 29c, indicated with dashed lines in FIG. 3, are attached to the respective front and rear portions of the door frame 30 by welding. The front and rear portions of the first section 29a of the second reinforcing member in contact with the first reinforcing member 28 are flared in the vertical direction. This arrangement increases the contact area and provides space for mechanical attachment means connecting the first section 29a to the second and third sections 29b, 29c. As shown in FIG. 3, the front and rear portions of the first section 29a are each provided with three attachment points 33, 34 for nut and bolt connectors. The different sections of the second reinforcing member 29 have a substantially hat-shaped cross-section, which will be described further in connection with FIGS. 7 and 8 below.

FIG. 3 also schematically indicates, by dash-dotted lines, the location of a window operating mechanism 35a, 35b. The window operating mechanism 35a, 35b is mounted to the first reinforcing member 28 and is located between the first and second reinforcing members 28, 29 and the outer skin panel of the door.

Figure 4:
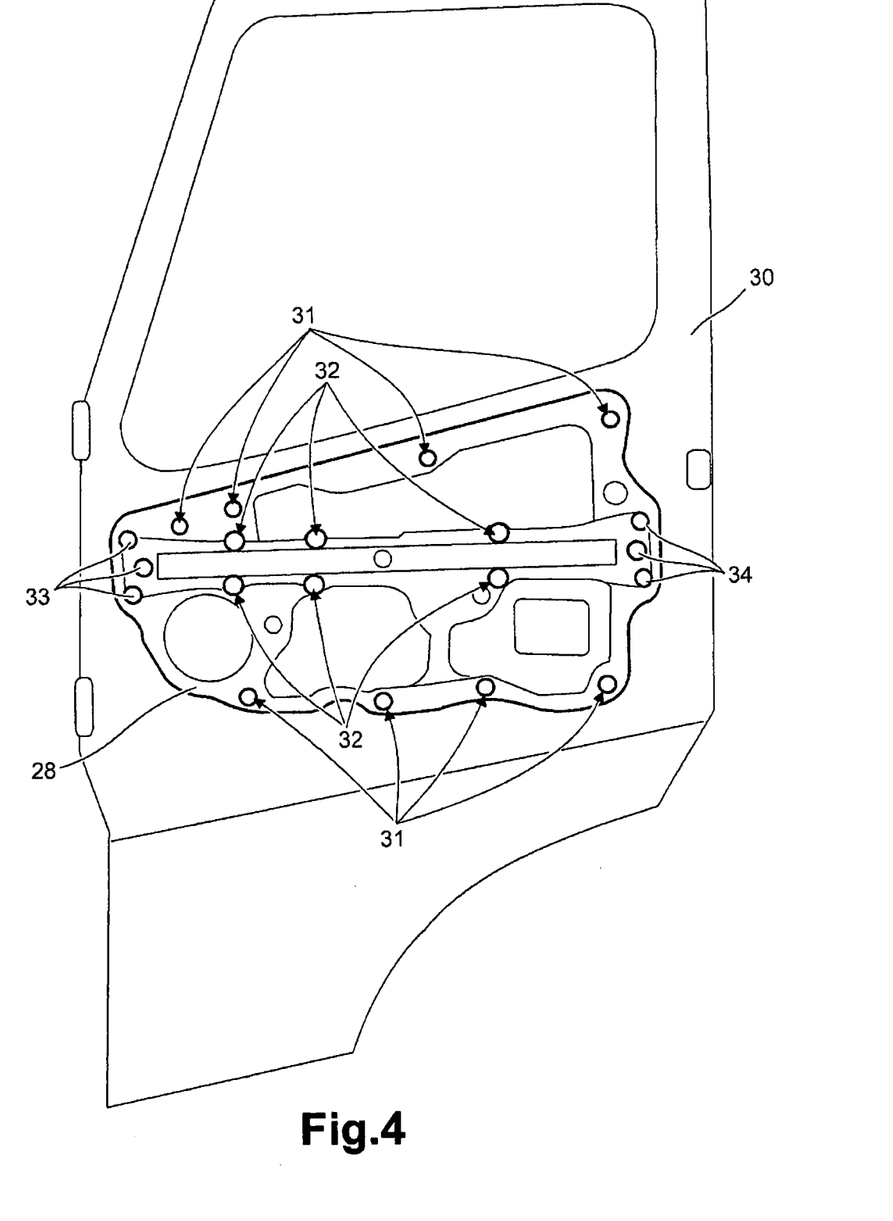
FIG. 4 shows a schematic detailed view of a door frame with a door module as shown in FIG. 3.

FIG. 4 shows a schematic detailed view of a door frame with a door module as shown in FIG. 3. In this example, the door module, to which a number of additional components can be attached, comprises the first reinforcing member 28. The figure indicates the location of the first attachment points 31' adjacent the peripheral edge of the first reinforcing member 28, where the said first reinforcing member 28 is attached to the door frame 30. The figure further indicates the second attachment points 32' arranged in the longitudinal direction of the first reinforcing member 28, at which points 32' the first section 29a of the second reinforcing member 29 (FIG. 3) can be attached adjacent its upper and lower longitudinal edges. The first reinforcing member 28 is further provided with three front attachment points 33' and three rear attachment points 34' at a front portion and a rear portion, respectively, where the respective second and third sections 29b, 29c of the second reinforcing member 29 (FIG. 3) are to be joined with the first section 29a.

Figure 5:
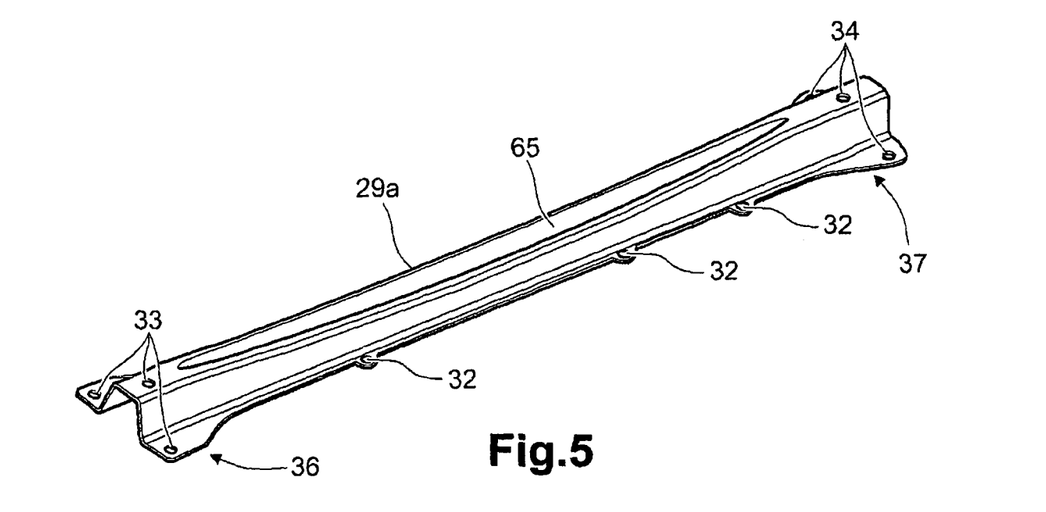
FIG. 5 shows a schematic partial cross-sectional view of the door module as shown in FIG. 5.

FIG. 5 shows a schematic view of a reinforcing beam as indicated in FIG. 3. The first section 29a of the second reinforcing member 29 is provided with a number of second attachment points 32 adjacent its upper and lower longitudinal edges which are to be placed in contact with the first reinforcing member 28 (FIG. 3).

Figure 6:
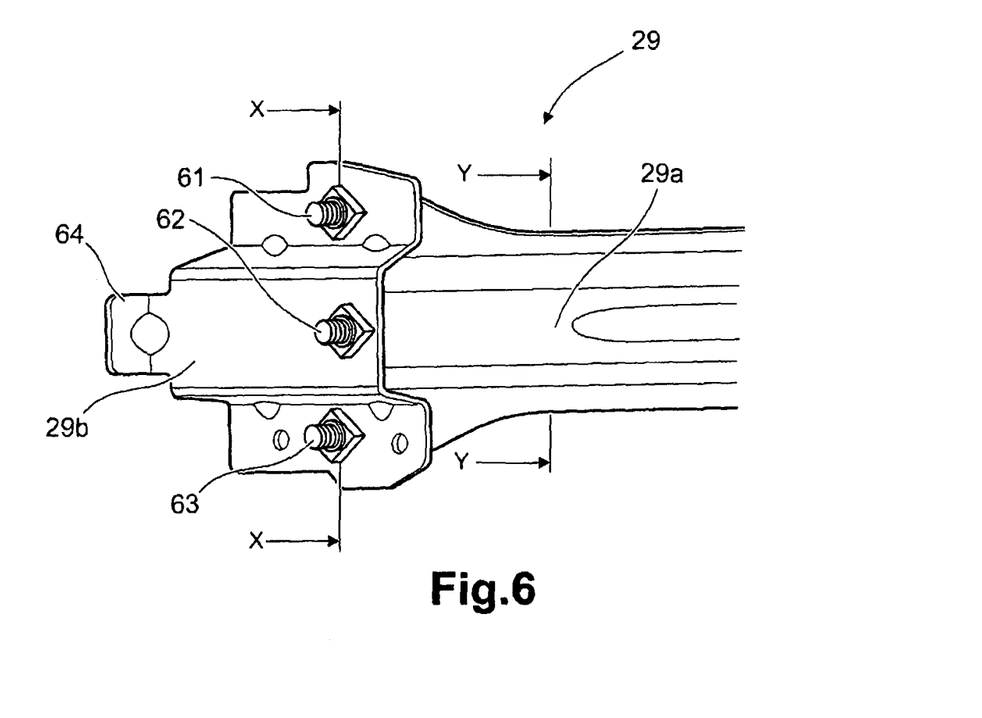
FIG. 6 shows a schematic enlarged perspective view of a reinforcing beam as shown in FIG. 3.

The front and rear portions of the first section 29a are each provided with three front and three rear attachment points 33, 34, respectively, for nut and bolt connectors (FIG. 6). The front and rear portions 36, 37 of the hat profile, where the respective second and third sections 29b, 29c of the second reinforcing member 29 (FIG. 3) are to be joined with the first section 29a, are flared outwards in the portion arranged to contact the first reinforcing member. This arrangement increases the contact area and provides space for mechanical attachment means connecting the first section 29a to the second and third sections 29b, 29c, as well as to the first reinforcing member.

FIG. 6 shows an enlarged perspective view of an attachment bracket attached to a front end of an reinforcing beam as shown in FIG. 3. Each said second and third sections 29b, 29c comprises a single pressed sheet metal component, in the form of a bracket, made from a high strength steel or a similar suitable material. The thickness of the sheet metal components making up the second and third sections 29b, 29c can be equal to or greater than that of the first section 29a.

Each of the second and third sections 29b, 29c are attached to their respective end of the first section 29a by means of a nut and bolt arrangement, in this case using three bolts 61, 62, 63 at each end of the first section 29a (only one end shown). In addition, each of the second and third sections 29b, 29c are attached the door frame (not shown) by means of welding. The example in FIG. 6 also shows the front, second section 29b provided with an optional tongue 64 at right angles to the longitudinal extension of the second reinforcing member 29. This tongue 64 is welded to the door frame and provides additional rigidity to the reinforcing structure.

FIGS. 7 and 8 shows two schematic cross-sections through the reinforcing structure and an associated attachment bracket as shown in FIGS. 3 and 6.

FIG. 7 shows a cross-section through the plane X-X in FIG. 6. As can be seen from the figure, the first section 29a and the second section 29b comprises mating portions with a profiled substantially hat shaped cross-section. The first section 29a and the second section 29b has the same cross-sectional profile to facilitate assembly of the sections by means of the nut and bolt arrangement 61, 62, 63 at the end of the first section 29a. This arrangement is the same at both ends of the second reinforcing member 29 and the second and third sections 29b, 29c retain their profiled cross-section at least up to their attachment points with the door frame. A central portion of the first section 29a can be provided with a shaped longitudinal recess 65 into the upper section of the hat-shaped profile, as shown in FIGS. 5 and 7. This shaped recess is provided to increase to impact strength of the first section 29a in its longitudinal direction.

FIG. 8 shows a cross-section through the plane Y-Y in FIG. 6. As can be seen from the figure, the first section 29a has a substantially hat-shaped profile with side surfaces 81, 83 in a first plane and an upper surface 82 in a second plane parallel to the first plane. The first and second planes are separated by a distance H. In order to facilitate assembly of the first section 29a and the second and third sections 29b, 29c, the distance between the planes containing the corresponding mating surfaces on the second and third sections 29b, 29c is substantially the same as the distance H.

The invention is not limited to the examples described above, but may be varied within the scope of the appended claims. For instance, the cross-sectional shape of the second reinforcing member is not necessarily limited to a hat-shaped profile, but may be given alternative suitable shapes. Further, the second reinforcing member extending in the longitudinal direction of the vehicle from a front portion of the door frame can be attached at or near a hinge and extend towards a latching means at a rear portion of the door frame. In this context, the wording "at or near" is not intended to limit the positioning of the second reinforcing member to a location immediately adjacent a hinge, as defined in the general portion of the description.

The invention claimed is:

1. Reinforcing structure in a vehicle door, which structure is arranged to transfer impact forces in the longitudinal direction of the vehicle, the comprising
 a first reinforcing member attached to a door frame and having a longitudinal and vertical extension between a front portion of the door frame to a rear portion of the door frame;
 a second reinforcing member extending in the longitudinal direction of the vehicle from a front portion of the door frame at or near a hinge towards a latching means at a rear portion of the door frame, where the second reinforcing member comprises a profiled cross-section and has a greater longitudinal extension than the first reinforcing member, and the first reinforcing member and the second reinforcing member are connected to form a structure with a closed cross-section.

2. Reinforcing structure according to claim 1, wherein the second reinforcing member is a beam attached at its ends at or adjacent the the hinge and at the latching means.

3. Reinforcing structure according to claim 1, wherein the second reinforcing member comprises a first section attached to the first reinforcing member and at least one further section attached between the first section and the door frame.

4. Reinforcing structure according to claim 3, wherein the second reinforcing member comprises a first section attached to the first reinforcing member, a second section attached at the hinge, and a third section attached at the latching means.

5. Reinforcing structure according to claim 4, wherein the first section and the at least one further section comprises mating portions with profiled cross-sections.

6. Reinforcing structure according to claim 1, wherein both ends of the second reinforcing member are connected to the door frame to form a structure with a closed cross-section.

7. Reinforcing structure according to claim 1, wherein the second reinforcing member has a hat-shaped cross-section.

8. Reinforcing structure according to claim 1, wherein the longitudinal axis of the second reinforcing member is arranged parallel to a straight line connecting the hinge and the latching means.

9. Reinforcing structure according to claim 1, wherein the first and second reinforcing members are arranged so that a straight line connecting the hinge and the latching means coincides with the closed cross-section.

10. Reinforcing structure according to claim 1, wherein the reinforcing structure is arranged between an inner skin panel and a window supporting structure in the vehicle door.

11. Reinforcing structure according to claim 1, wherein the first reinforcing member is a door module onto which a number of accessories are attached.

12. Vehicle provided with an reinforcing structure according to claim 1.

13. Vehicle according to claim 12, wherein the vehicle is a cab-over commercial vehicle.

* * * * *